United States Patent Office 3,250,516
Patented May 10, 1966

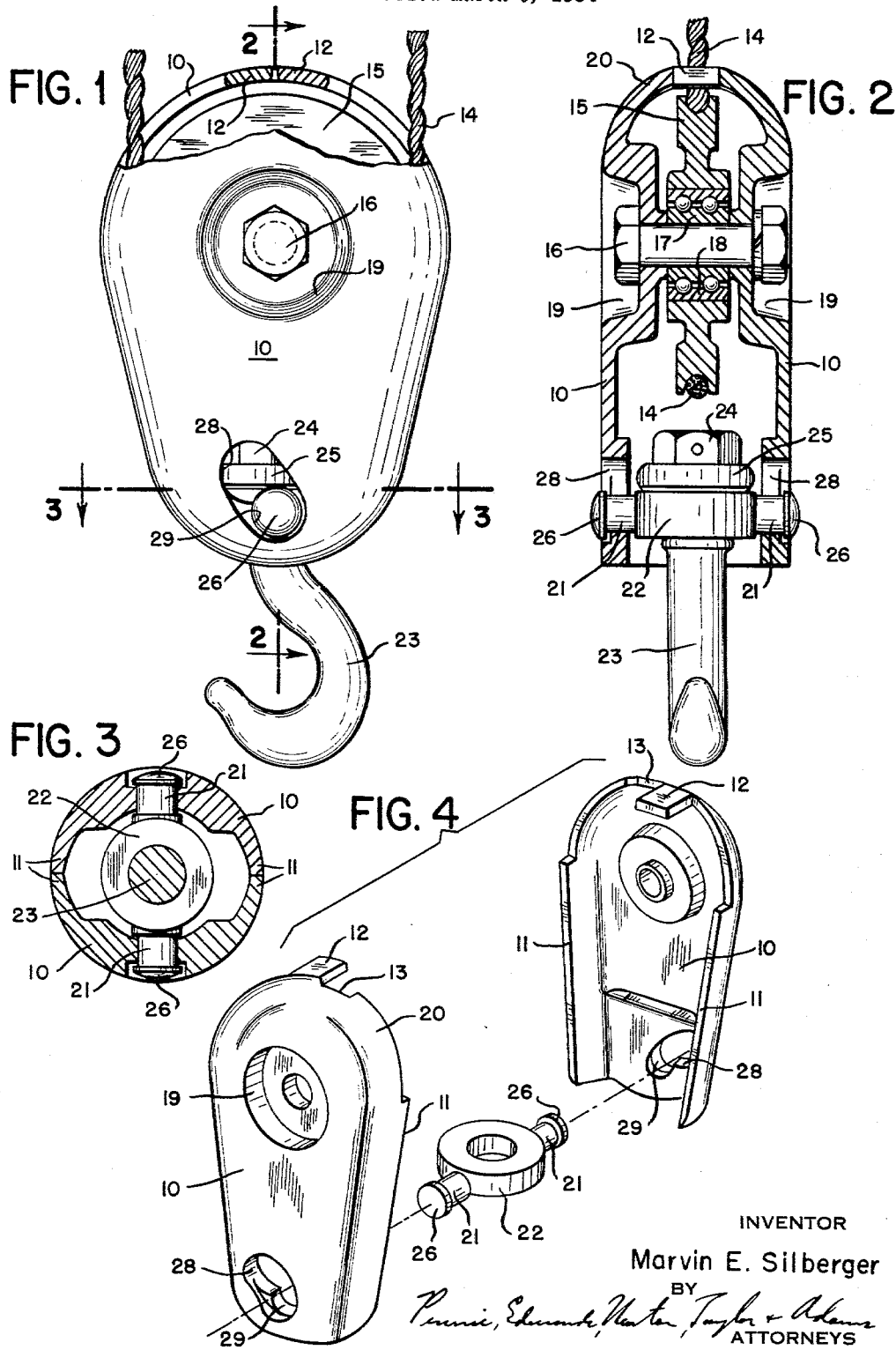

3,250,516
HOIST BOTTOM BLOCK
Marvin E. Silberger, York, Pa., assignor to American Chain & Cable Company, Inc., New York, N.Y., a corporation of New York
Filed Mar. 5, 1964, Ser. No. 349,620
4 Claims. (Cl. 254—192)

This invention relates to hoists, and has particular reference to the bottom block, that is, the block usually provided with a hook by which a load is lifted.

It is customary to provide hoists with a lower hook which opens when overloaded, the opening of the hook thus preventing lifting of loads which would cause failure of the hoist lines or some part of the hoist mechanism. When hoists are used for rigging for example, overloading is not uncommon, because of the nature of the loads, and also because in some applications the pulling force required is not always certain, as for instance, when attempting to draw parts together. When such a mishap occurs, the insertion of a new hook requires a disassembly and reassembly which are time-consuming and complicated in the present designs. The chief reason for this is the positive nature of the joint required, to prevent the hook from accidentally coming loose in use, despite the fact that it must swivel easily and also have a limited pivotal movement with respect to the block.

It is therefore a primary object of the present invention to provide a bottom block with a replaceable hook which can be changed with a minimum of delay.

It is a further object of the present invention to provide a hook and block assembly which will not disengage inadvertently.

Referring now to the drawings, FIG. 1 is an elevation partly in section, of a preferred form of the present invention;

FIG. 2 is a section on line 2—2 of FIG. 1, looking in the direction of the arrows;

FIG. 3 is a section on line 3—3 of FIG. 1, looking in the direction of the arrows; and, FIG. 4 is an exploded perspective view illustrating the method of assembly.

The block comprises a pair of side plates 10, identical in all respects having a shape most readily apparent in FIG. 4. These side plates have inwardly extending flanges or skirts 11 forming sides, and long inwardly extending tabs 12 which together form a closure for the top. Thus, when the skirts are in abutment with each other the tabs are disposed side by side and project into recesses 13 on the opposite side plates so that a hollow body is formed which is open at the bottom and which has two openings at the top for passage of a lifting line 14. In the particular structure shown, the line is a wire rope, but chain could of course be used. The sheave could be adapted to block or roller chains or other support means. Since the edges of the skirt 11 and the outer end of the flange 12 on either sideplate 10 define flanges which are not coplanar, the assembled sideplates cannot be rotated together by mistake.

A sheave 15 is mounted for rotation within the block, being secured therein by a bolt 16, passing through an inner race 17 of an antifriction bearing, an outer race 18 of which is secured within the center bore of the sheave 15. This bolt 16 in cooperation with the tabs 12 secures the two side plates 10. In order to prevent the block from catching on objects, recesses 19 may be provided for the bolt head and nut, and the top edge of each side plate is curved inwardly and rounded to neatly house the sheave. At the same time, inwardly extending portions 20 of the housing serve to guide the hoist line and prevent it from jamming between the block and the sheave.

It is desirable that the hook have a pivotal motion with respect to the block body. Also, the hook must be rotatable with respect to the block, so that turning of the load will not foul the parts of the hoist line. These objects are accomplished by the provision of trunnions 21 integral with a support ring 22, which trunnions are supported in openings in the side plates of the block. A hook 23 has its stem inserted through the opening in the ring 22. A nut 24 or other like means attaches a thrust bearing 25 to the stem of the hook 23 and supports the load. Because of this contribution, the upper race of the thrust bearing 25 will abut the hook nut 24 which is removably attached to the hook 23 and is of adequate strength to support the rated load safely. Whenever replacement is needed due to wear or previous overload-caused deformation of the parts, the full sub-assembly consisting of elements 22 to 25 or any part thereof can be readily replaced.

In order to assure that the hook assembly stays in place, properly centered, each trunnion of the support ring is provided with a bulbous head 26 and openings 28 in the sideplates are fashioned as shown. The openings 28 for the mounting of the support ring 22 in each of the sideplates 10 are formed somewhat like a curved key slot. The upper portion of this slot is large enough to permit entry of the bulbous trunnion head 26. The lower portion of the key slot at 29 is reduced; it is large enough to permit rotation of the necked portion of the trunnion but too small to pass the head 26. When assembled, the two halves are right hand and left hand like and the curved openings in the assembled state will fall in opposite directions and, in this manner, effectively restrict and locate the support trunnions 21 of the ring 22. In addition, the bulbous heads 26 prevent spreading of the sideplates 10. The openings in the sideplates can be partially recessed to protect the bulbous ends and to improve appearance.

To assemble the device, the bulbous heads 26 of the hook assembly are passed through openings 28 in the sideplates and are slid down into restricted portion 29. The sheave is placed into the hollow cavities of the sideplates 10 and the sideplates with the sheave are rotated relative to each other around trunnions 21 and into alignment with each other. The axle bolt 16 is passed through the sideplates and sheave bearing holes and fastened in with nut. Thus assembled, the sideplate halves will be held in firm alignment by the axle bolt 16 and the trunnions 21 with their enlarged ends.

I claim:
1. In a bottom block for a hoist having a sheave for the hoist line and a hook for supporting the load, the combination of a pair of side plates forming the body of the block, a bolt extending through the side plates and the center of the sheave holding the side plates together and forming a support for the sheave, and a ring having a pair of trunnions, each of the trunnions having a head and reduced neck portion, an opening in each side plate having an enlarged upper portion for passage of a trunnion head and a reduced lower portion for reception of a trunnion neck, and means suspending the hook from the ring for rotation with respect thereto.

2. In a bottom block for a hoist having a sheave for the hoist line and a hook for supporting the load, the combination of a pair of side plates forming the body of the block, a bolt extending through the side plates and the center of the sheave holding the side plates together and forming a support for the sheave, and a ring having a pair of trunnions, each of said trunnions having a head and reduced neck portion, an opening in each side plate having an enlarged upper portion for the passage of a trunnion head and a reduced lower portion for reception of a trunnion neck, the reduced lower portion being laterally displaced from the upper portion, and means suspending the hook from the ring for rotation with respect thereto.

3. In a bottom block for a hoist having a sheave for the hoist line and a hook for supporting a load, the combination of a pair of side plates having flanges, said side plates with their flanges forming a hollow body for the sheave and part of the hook, when said flanges are in abutting relation, an opening in each side plate for the reception of a sheave-supporting bolt, an opening in each side plate below the bolt opening, each of the latter openings having an enlarged upper portion, a ring having a pair of headed trunnions in said latter openings, and means for securing the hook within the ring for rotation with respect thereto.

4. A bottom block according to claim 1 wherein said side plates have nonplanar abutting flange means for preventing relative rotation of the plates.

References Cited by the Examiner
UNITED STATES PATENTS

| | | | |
|---|---|---|---|
| 2,332,389 | 10/1943 | Manney | 254—192 |
| 2,374,118 | 4/1945 | Moore | 254—193 |
| 2,633,329 | 3/1953 | Le Bus | 254—193 |
| 2,650,403 | 9/1953 | Taylor | 254—192 |
| 3,189,323 | 6/1965 | Kliss | 254—193 |

EVON C. BLUNK, *Primary Examiner.*

SAMUEL F. COLEMAN, *Examiner.*

H. C. HORNSBY, *Assistant Examiner.*